(12) United States Patent
van der Sluis et al.

(10) Patent No.: US 9,416,846 B2
(45) Date of Patent: Aug. 16, 2016

(54) DRIVE BELT COMPRISING DIFFERENT TYPES OF TRANSVERSE MEMBERS FOR A CONTINUOUSLY VARIABLE TRANSMISSION

(71) Applicant: ROBERT BOSCH GMBH, Stuttgart, DE (US)

(72) Inventors: Francis Maria Antonius van der Sluis, Sint-Michielsgestel (NL); Joost Johannes Cornelis Jonkers, Gilze (NL)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/368,920

(22) PCT Filed: Dec. 28, 2012

(86) PCT No.: PCT/EP2012/077073
§ 371 (c)(1),
(2) Date: Jun. 26, 2014

(87) PCT Pub. No.: WO2013/098403
PCT Pub. Date: Jul. 4, 2013

(65) Prior Publication Data
US 2015/0045166 A1     Feb. 12, 2015

(30) Foreign Application Priority Data

Dec. 30, 2011   (NL) ..................................... 1039277

(51) Int. Cl.
*F16G 5/16*         (2006.01)
(52) U.S. Cl.
CPC ....................... *F16G 5/16* (2013.01)

(58) Field of Classification Search
CPC ..................................... F16G 5/16; F16G 5/18
USPC ................................................... 474/201, 245
See application file for complete search history.

(56) References Cited

U.S. PATENT DOCUMENTS

| 4,516,963 | A | * | 5/1985 | Mott ............................. 474/245 |
| 4,794,741 | A | * | 1/1989 | van Dijk ........................ 451/82 |
| 4,824,424 | A | * | 4/1989 | Ide et al. ....................... 474/242 |
| 6,578,249 | B2 | * | 6/2003 | Fujioka .......................... 29/434 |

(Continued)

FOREIGN PATENT DOCUMENTS

DE      849 944 C       9/1952
EP   0 305 023 A1       3/1989

(Continued)

OTHER PUBLICATIONS

International Search Report, dated Apr. 15, 2013, from corresponding PCT application.

*Primary Examiner* — William E Dondero
*Assistant Examiner* — Mark K Buse
(74) *Attorney, Agent, or Firm* — Young & Thompson

(57) ABSTRACT

A drive belt (3) includes an endless carrier (31) and a plurality of transverse members (32) of varying thickness, i.e. the dimension measured in the circumference direction of the belt (3). According to the invention, the design of such drive belt (3) can be improved, at least in terms of durability, by also varying the width, i.e. the dimension measured in the axial direction "W" of the drive belt (3), of the transverse members (32) in such a way that the thinner transverse members (32) of the drive belt (3) are of a larger width than the thicker transverse members (32) thereof.

14 Claims, 2 Drawing Sheets

(56) References Cited

Figure 1:
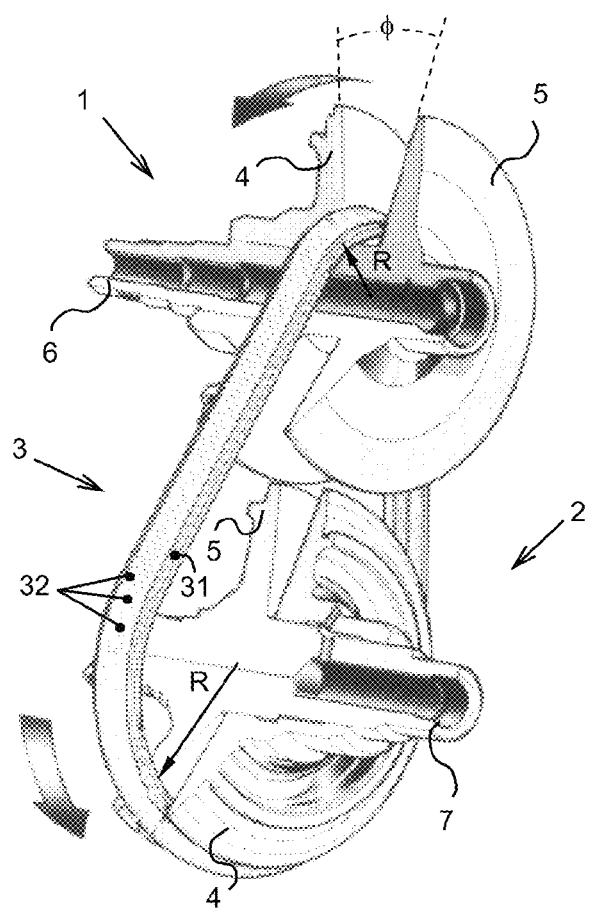

U.S. PATENT DOCUMENTS 8,104,159 B2 * 1/2012 Hattori et al. ............. 29/407.05
2009/0182446 A1 * 7/2009 Hattori et al. ................ 700/103

FOREIGN PATENT DOCUMENTS

| EP | 1 178 240 A2 | 2/2002 |
| JP | 61 103651 U | 7/1986 |

* cited by examiner

DRIVE BELT COMPRISING DIFFERENT TYPES OF TRANSVERSE MEMBERS FOR A CONTINUOUSLY VARIABLE TRANSMISSION

The present invention relates to a drive belt for a continuously variable transmission, which is in particular destined to be arranged around two pulleys of the transmission and which comprises a plurality of discrete transverse elements or members for contacting the transmission pulleys, as well as one or more endless, i.e. ring shaped, carriers for carrying and guiding the transverse members in the transmission. The present type of drive belt is also known as a push belt.

Each endless carrier of the drive belt is typically composed of a plurality of mutually nested, continuous flexible metal bands and is also known as a ring set. Each endless carrier is at least partly inserted in a recess provided in the transverse members. In case the drive belt comprises only one endless carrier, such carrier is typically mounted in a central recess of the transverse members that opens towards the radial outside of the drive belt. However, usually the drive belt is provided with at least two endless carriers that are each mounted in a respective one of two recesses of the transverse members, which recesses then open towards a respective axial or lateral side of the transverse members, i.e. of the drive belt.

The transverse members of the drive belt are slidingly arranged along the circumference of the endless carrier or carriers in a virtually continuous row, such that these members are able to transmit forces which are related to a movement of the drive belt. The transverse members have two main body surfaces which, at least partly, extend substantially parallel with respect to each other and which are separated from each other over the (local) thickness of the transverse member by a circumferential side surface. As seen along the circumference of the carrier, the transverse members have a comparatively small dimension, i.e. thickness, such that a several hundreds thereof are present in the drive belt. Adjoining transverse members are designed to be able to tilt relative to one another, such that the belt is able to follow a curved trajectory. To accommodate and control such relative tilting, one of the two main body surfaces of the two adjoining transverse members in the drive belt that are mutually in contact is provided with a so-called rocking edge in the form of an axially and radially extending section of the respective main body - surface(s) that is convexly curved in radial direction. In this respect it is noted that the radial direction is defined relative to the drive belt when it is placed in a circular trajectory.

Parts of the side surface of the transverse members, which parts are predominantly oriented in the axial direction, i.e. widthwise, are corrugated and are intended for frictionally contacting the transmission pulleys, in particular by being clamped widthwise between two conical sheaves of such pulleys. The friction contact between the transverse members and the conical pulley sheaves allows a force to be transmitted there between, such that the drive belt can transfer a drive torque and rotational movement from one transmission pulley to the other.

Although, typically, the majority of the transverse members of a drive belt are identically shaped, it is also well-known to include two or more types of transverse members of mutually different design into a single drive belt. In this latter respect, it is known in the art to provide the drive belt with transverse members having a mutually different thickness, i.e. the transverse members of a first type being thinner (or thicker) than the transverse members of a second type. For example, in the European patent publication EP1178240 (A2) it is described to include three types of transverse members into a single drive belt, whereof each type shows a different thickness, in order to efficiently reduce the amount of clearance between the transverse members in the row of transverse members that spans the circumference of the endless carrier(s) in the drive belt. Further, from the European patent publication EP 0305023 (A1) it is known to provide the drive belt with two or more types of transverse members of mutually different thickness and to randomly mix these transverse members amongst another as they are incorporated in the drive belt along the circumference of the endless carrier(s) thereof, in order to attenuate the noise caused by the transverse members successively impacting the transmission pulleys during operation of the transmission.

It is an object of the present invention to improve the design and operation of this known drive belt including transverse members of different thickness. More in particular, the present invention aims to reduce the load exerted on the transverse members in the curved trajectory of the drive belt, at least on average.

The invention departs from on the technical insight that, due to the nature and the geometry of the contacts between the adjoining transverse members and between a transverse member and the pulley sheaves, a titling and a radial sliding occur between the transverse members. Because transverse members are of different thickness such tiling and radial sliding is unequally distributed between these transverse members. As a result, the curved row of transverse members between the pulley sheaves will not be as continuous and regular as when all transverse members would be of equal thickness. At least the axial load (i.e. the clamping force) exerted by the pulley sheaves on the transverse members in transverse direction will not be equally distributed between them. In particular, the thinner transverse members will be axially loaded (clamped) to lesser extent than the thicker transverse members.

The invention aims to overcome or at least reduce above-described phenomenon and the disadvantages that are associated therewith by providing the drive belt with the technical features of claim 1 hereinafter. Thus, in accordance with the invention, the axial dimension, i.e. width of a transverse member is related to the thickness of that particular transverse member. In particular, in the drive belt, a width of a (relatively) thin transverse member is greater than the width of a (relatively) thick transverse member.

As a result, the clamping force and axial load exerted by the pulley sheaves on the thinner transverse member is raised, at least relative to such load on the thicker transverse member. Preferably, the width of the thinner transverse member is chosen, relative to the width of the thicker transverse member, such that, during operation of the drive belt in the transmission, the transverse members thereof experience a similar axial load. At least in a first approximation, such similar axial loads may be realized by adopting the same proportion between the different width dimensions of the transverse members as is applied between the different thickness dimensions thereof.

The invention will be explained in more detail on the basis of the following description of the invention with reference to the drawing and in relation to a preferred embodiment thereof. In the drawing figures equal reference signs indicate equal or similar structures and/or parts.

FIG. 1 provides a schematic perspective view of the continuously variable transmission with a drive belt running over two pulleys, which drive belt includes an endless carrier, as well as a number of transverse members.

Figure 2:
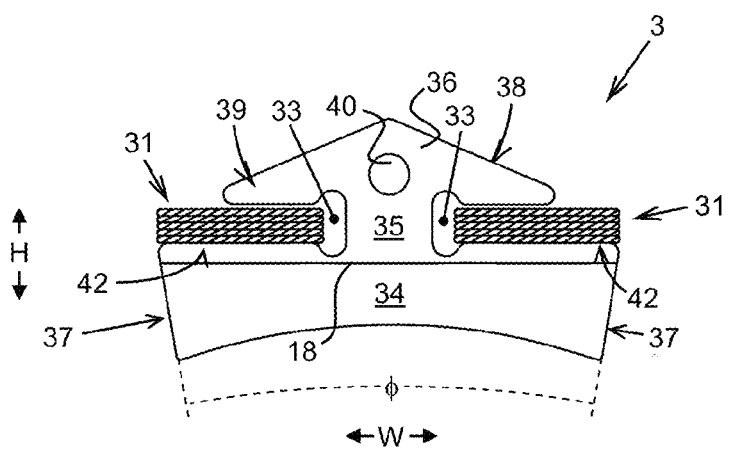

FIG. 2 shows a cross section of the known drive belt viewed in the circumference direction thereof.

Figure 3:
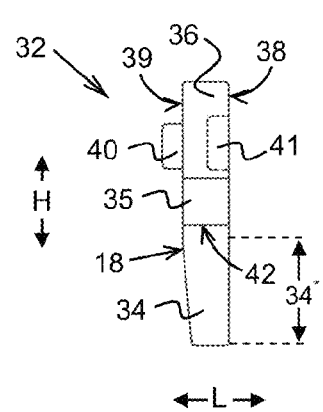

FIG. 3 provides a width-wise oriented view of a transverse member of the known drive belt.

Figure 4:
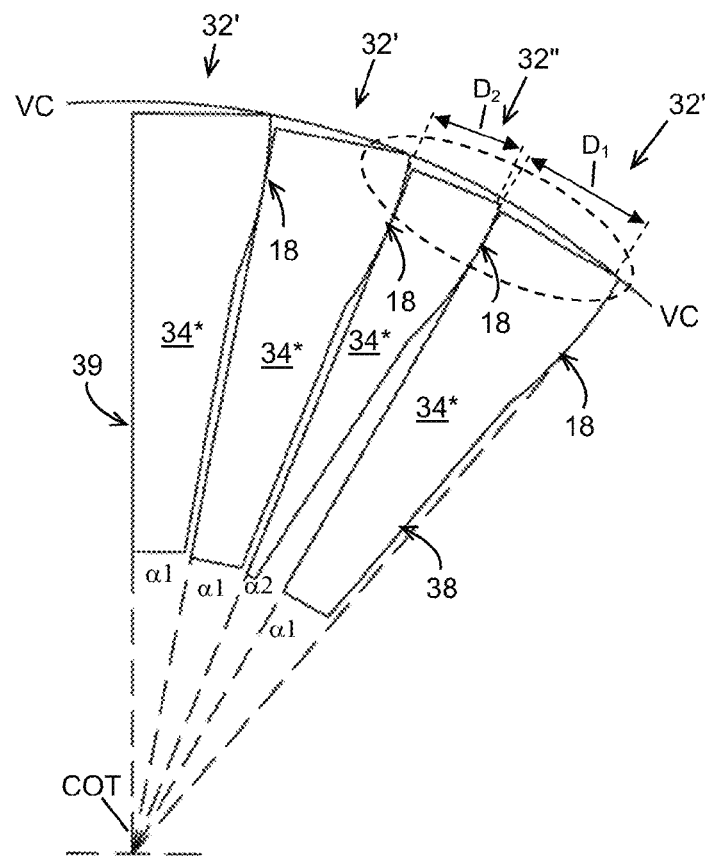

FIG. 4 provides a schematic representation of a curved part of the drive belt, which part is provided with, otherwise identically shaped transverse members of mutually different thickness.

Figure 5:
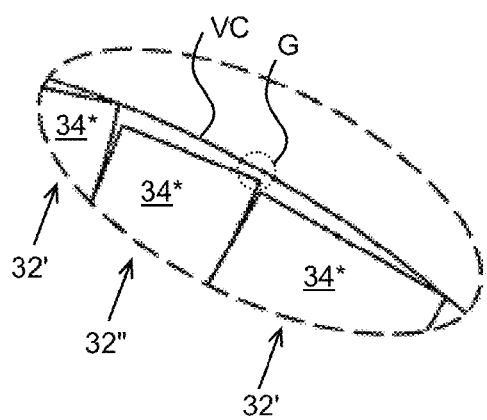

FIG. 5 provides an enlargement of a section of FIG. 4.

Figure 6:
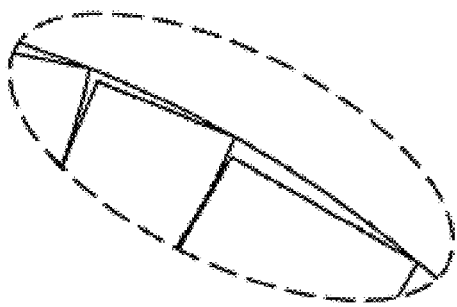

FIG. 6 illustrates the present invention along an enlargement of a section of the drive belt according to the present invention similar to FIG. 5.

The schematic illustration of a continuously variable transmission in FIG. 1 shows a drive belt 3 which runs over two pulleys 1, 2 and which includes a closed, i.e. endless carrier 31 and an essentially contiguous row of transverse members 32 that are mounted on and arranged along the circumference of the carrier 31. In the illustrated position, the upper pulley 1 rotates more quickly than the lower pulley 2. By changing the distance between the two conical sheaves 4, 5 of each pulley 1, 2, the so-called running radius R of the drive belt 3 on the respective pulleys 1, 2 can be changed and, as a result, the rotational speed ratio i between the two pulleys 1, 2 can be varied. This is a known manner of varying a difference in rotational speed between an input shaft 6 and an output shaft 7 of the transmission.

In FIG. 2, the drive belt 3 is shown in a cross section thereof facing in the circumference or length direction L of the belt 3, i.e. facing in a direction perpendicular to the axial or width W direction and the radial or height H direction thereof. This FIG. 2 shows the presence of two endless carriers 31 that are shown in cross-section and that carry and guide the transverse members 32 of the drive belt 3, whereof one transverse member 32 is shown in front elevation.

The transverse members 32 and the endless carriers 31 of the drive belt 3 are typically made of metal, usually steel. The transverse members 32 take-up a clamping force exerted between the sheaves 4, 5 of each pulley 1, 2 via pulley contact faces 37 that are provided on either axial side thereof. These pulley contact faces 37 are mutually diverging in radial outward direction to essentially match a V-angle defined between the two sheaves 4, 5 of each pulley 1, 2. The transverse members 32 are able to move, i.e. to slide along the endless carriers 31 in the circumference direction L, so that when a force is transmitted between the transmission pulleys 1, 2, this force is transmitted by the transverse members 32 pressing against one another and pushing each other forward in a direction of rotation of the drive belt 3 and the pulleys 1, 2. The endless carriers 31 hold the drive belt 3 together and, in this particular exemplary embodiment, are composed of five individual endless bands each, which endless bands are mutually concentrically nested to form the endless carrier 31. In practice, the endless carriers 31 often comprise more than five endless bands, e.g. up to twelve or more.

The transverse member 32, which is also shown in side view in FIG. 3, is provided with two cut-outs 33 located opposite one another and opening towards opposite sides of the transverse member 32. Each cut-out 33 accommodates a respective one of the two endless carriers 31. A first or base portion 34 of the transverse member 32 thus extends radially inwards from the endless carriers 31, a second or middle portion 35 of the transverse member 32 is situated in between the endless carriers 31 and a third or top portion 36 of the transverse member 32 extends radially outwards from the endless carriers 31. The radially inward side of a respective cut-out 33 is delimited by a so-called bearing surface 42 of the base portion 34 of the transverse member 32, which bearing surface 42 faces radially outwards in the general direction of the top portion 36. This bearing surface 42 contacts the inside of the endless carrier 31, especially in the parts of the drive belt 3 that are wrapped around and in contact with the transmission pulleys 1, 2.

A first or rear surface 38 of the two main body surfaces 38, 39 of transverse member 32 that face in mutually opposite circumference directions L, is essentially flat. The other or front main body surface 39 of the transverse member 32 is provided with a so-called rocking edge 18 that forms, in the radial direction H, the transition between an upper part of the front surface 39, extending essentially in parallel with its rear surface 38, and a lower part thereof that is slanted such that it extends towards the rear surface 38. In FIG. 2 the rocking edge 18 is indicated only schematically by way of a single line, however, in practice the rocking edge 18 is mostly provided in the shape of section 18 of the said front surface 39, which section 18 is straight and flat in the axial direction W, but is convexly curved in the radial direction H. Thus, an upper part of the transverse member 32 that is located radially outward from/above the rocking edge 18 is provided with an essentially constant dimension between the main body surfaces 38, 39 thereof, i.e. as seen in the circumference direction, which dimension is typically referred to as the thickness of the transverse member 32.

In FIG. 4 a lower part 34* from the upper end of the rocking edge 18 downward (see also FIG. 3) of several transverse members 32 is shown in a mutually rotated position that is representative of a part of the drive belt 3 that is wrapped around and in contact with a transmission pulley 1, 2, while rotating around the center of rotation COT of that pulley 1, 2. FIG. 4 covers a group four adjacent transverse members 32 in the said part of the drive belt 3, whereof a thickness D2 of one transverse member 32" is less than the thickness D1 of the other transverse members 32'. It is noted that FIG. 4 is not drawn to scale in order to more clearly illustrate the present invention.

From the FIG. 4 it follows that the transverse members 32, 32', 32" of different thickness not only assume a different tilting angle α1, α2 relative to a succeeding transverse member 32, 32', 32", but also that the geometrically determined position of the thinner transverse member 32" differs from that of the thicker transverse members, at least in the radial direction. In fact, due to the mutual rotation of the transverse members 32, 32', 32" between the pulley sheaves 4, 5, the upper end of the rocking edge 18 of the thinner transverse member 32", as geometrically determined by such rotation, lies radially inside a virtual circle VC connecting the upper end of the rocking edge 18 of the thicker transverse members 32'.

For the sake of clarity the section of FIG. 4 indicated by the dashed ellipse is shown again as FIG. 5, however, on a larger scale. From this FIG. 5 it appears that a gap G is present between the upper end of the rocking edge 18 of the thinner transverse member 32" and the said virtual circle VC. This FIG. 5 thus suggests that the thinner transverse member 32" can, to a certain extent, move in the height direction H, because it is not (forced) in contact with the endless carrier 31 of the drive belt 3. In reality, the thinner transverse member 32" will at least receive a clamping force that is less than that received by the thicker transverse members 32'.

To remove such difference in the received clamping force, i.e. in the (axial) loading of the transverse members 32, 32', 32", the thinner transverse members 32" are produced wider than the thicker transverse members 32'. In other words, a dimension in the axial direction W or width of the thinner transverse members 32" is increased relative to such width of the thicker transverse members 32'. As a result, the thinner transverse members 32" have the tendency to ride higher, i.e.

at a larger radius R (see FIG. 1), between the pulley sheaves 4, 5, as compared to the thicker transverse members 32'. This latter geometric configuration of the drive belt 3 is schematically illustrated in FIG. 6.

Because of the presence of the endless carrier 31, the said tendency is counter-acted, however only at the expense of an increased clamping force experienced by the transverse members 32" concerned (as sought after by the present invention). In practice, an increase of 0.1% to 2.5% of the width of the thinner transverse members 32" relative to the width of thicker transverse members 32' will typically suffice to obtain the desired effect, i.e. to obtain a substantial equalization of the axial loads experienced by the thinner transverse members 32" and by the thicker transverse members 32' respectively.

It will be clear to a person skilled in the art that the scope of the present invention is not limited to the examples discussed above, but that several amendments and modification thereof are possible without deviating from the scope of the invention as defined in the appended claims.

The invention claimed is:

1. A drive belt (3) operable by contact with sheaves (4, 5) of pulleys (1, 2) of a transmission, the drive belt (3) comprising:
an endless carrier (31), the endless carrier (31) having a length direction (L); and
a number of consecutive transverse members (32) mounted slidable on the endless carrier (31),
each transverse member (32) provided with
i) a front main body surface (39),
ii) a rear main body surface (38), wherein a width (W) of each transverse member extends across the front body surface (39) between the opposite edges of each transverse member (32), a height direction extends in a radial direction (H) of each transverse member (32), and a thickness direction (L) of each transverse member extends from the front body surface (39) to the rear body surface (38),
iii) pulley contact faces (37), destined for contact with the sheaves (4, 5) of the pulleys (1, 2) of the transmission, extending from the front body surface (39) to the rear body surface (38) in the thickness direction along opposite edges of each transverse member (32), and
iv) a cut-out (33) with a radially inward side that defines a bearing surface (42) that accepts the endless carrier (31) with the endless carrier (31) extending perpendicular to the width of each transverse member in the thickness direction of each transverse member (32), the bearing surface (42) contacting an inside of the endless carrier (31),
wherein a base portion (34) of each transverse member (32) is located below the cut-out (33) and extends radially inwards from the endless carrier (31), and a top portion (36) of each transverse member (32) extends radially outwards from the endless carrier (31), and the base portion (34) of the front body surface (39) includes a rocking edge (18) that is convexly curved in the radial direction (H) with a first thickness of the base portion (34) at an upper end of the rocking edge (18) being greater than a second thickness of the base portion (34) at the lower end of the rocking edge (18),
wherein the transverse members (32) are comprised of at least a first type transverse member (32') and a second type transverse member (32"),
wherein the first thickness (D1) of the base portion (34) at the upper end of the rocking edge (18) of the first type transverse member (32') is greater by a first proportion than the first thickness (D2) of the base portion (34) at a corresponding upper end of the rocking edge (18) of the second type transverse member (32"),
wherein the second thickness of the base portion (34) at the lower end of the rocking edge (18) of the first type transverse member (32') is greater than the second thickness of the base portion (34) at a corresponding lower end of the rocking edge (18) of the second type transverse member (32"), and
wherein an overall width of the first type transverse member (32') is smaller by a second proportion than an overall width of the second type transverse member (32"), such that in operation the pulley contact faces (37) of both the first and second type transverse members (32', 32") make physical contact with the pulleys.

2. The drive belt (3) according to claim 1, wherein the first proportion is equal to the second proportion such that the i) the first thickness (D1) of the first type transverse member (32') is greater than the first thickness (D2) of the second type transverse member (32"), by an equal proportion to ii) the overall width of the first type transverse member (32') being smaller than the overall width of the second type transverse member (32").

3. The drive belt (3) according to claim 2, wherein the dimension in the width direction of the second type of transverse members (32") has a value in the range between 1.001 and 1.025 times the dimension in the width direction of the first type of transverse members (32').

4. The drive belt (3) according to claim 1, wherein the dimension in the width direction of the second type of transverse members (32") has a value in the range between 1.001 and 1.025 times the dimension in the width direction of the first type of transverse members (32').

5. The drive belt (3) according to claim 1, wherein,
the first thickness (D1) of the first type transverse member (32') is 1.001 times greater than the first thickness (D2) of the second type transverse member (32"), and
the overall width of the first type transverse member (32') is 1.001 times smaller than the overall width of the second type transverse member (32").

6. The drive belt (3) according to claim 1, wherein,
the first thickness (D1) of the first type transverse member (32') is 1.025 times greater than the first thickness (D2) of the second type transverse member (32"), and
the overall width of the first type transverse member (32') is 1.025 times smaller than the overall width of the second type transverse member (32").

7. The drive belt (3) according to claim 1, wherein,
the first thickness (D1) of the first type transverse member (32') is between 1.001 and 1.025 times greater than the first thickness (D2) of the second type transverse member (32"), and
the overall width of the first type transverse member (32') is between 1.001 and 1.025 times smaller than the overall width of the second type transverse member (32").

8. A drive belt (3) operable by contact with sheaves (4, 5) of pulleys (1, 2) of a transmission, the drive belt (3) comprising:
a pair of endless carriers (31), the endless carrier (31) having a length direction (L); and
consecutive transverse members (32) mounted slidable on the endless carrier (31),
each transverse member (32) provided with
i) a front main body surface (39),
ii) a rear main body surface (38), wherein a width (W) of each transverse member extends across the front body surface (39) between the opposite edges of each transverse member (32), a height direction extends in a radial direction (H) of each transverse member (32), and a thickness direction (L) of each transverse member extends from the front body surface (39) to the rear body surface (38), iii) pulley contact faces (37), destined for contact with the sheaves (4, 5) of the pulleys (1, 2) of the transmission, extending from the front body surface (39) to the rear body surface (38) in the thickness direction along opposite edges of each transverse member (32), iv) a pair of cut-outs (33), each cut-out with a radially inward side that defines a bearing surface (42) that accepts one of the endless carriers (31) with the endless carrier (31) extending perpendicular to the width of each transverse member in the thickness direction of each transverse member (32), the bearing surface (42) contacting an inside of the endless carrier (31), and v) a rocking edge (18) that is convexly curved in the radial direction (H) with a first thickness of the base portion (34) at an upper end of the rocking edge (18) being greater than a second thickness of the base portion (34) at the lower end of the rocking edge (18), wherein the transverse members (32) are comprised of at least a first type transverse member (32') and a second type transverse member (32"), wherein the first thickness (D1) of the base portion (34) at the upper end of the rocking edge (18) of the first type transverse member (32') is greater than the first thickness (D2) of the base portion (34) at a corresponding upper end of the rocking edge (18) of the second type transverse member (32"), and wherein an overall width of the first type transverse member (32') is smaller than an overall width of the second type transverse member (32"), such that in operation the pulley contact faces (37) of both the first and second type transverse members (32', 32") make physical contact with the pulleys.

9. The drive belt (3) according to claim 8, wherein,
the first thickness (D1) of the first type transverse member (32') is 1.001 times greater than the first thickness (D2) of the second type transverse member (32"), and
the overall width of the first type transverse member (32') is 1.001 times smaller than the overall width of the second type transverse member (32").

10. The drive belt (3) according to claim 8, wherein,
the first thickness (D1) of the first type transverse member (32') is 1.025 times greater than the first thickness (D2) of the second type transverse member (32"), and
the overall width of the first type transverse member (32') is 1.025 times smaller than the overall width of the second type transverse member (32").

11. The drive belt (3) according to claim 8, wherein,
the first thickness (D1) of the first type transverse member (32') is between 1.001 and 1.025 times greater than the first thickness (D2) of the second type transverse member (32"), and
the overall width of the first type transverse member (32') is between 1.001 and 1.025 times smaller than the overall width of the second type transverse member (32").

12. The drive belt (3) according to claim 8, wherein the overall width of the first type transverse member (32') is between 1.001 and 1.025 times smaller than the overall width of the second type transverse member (32").

13. The drive belt (3) according to claim 8, wherein the overall width of the first type transverse member (32') is 1.025 times smaller than the overall width of the second type transverse member (32").

14. A drive belt (3) operable by contact with sheaves (4, 5) of pulleys (1, 2) of a transmission, the drive belt (3) comprising:

an endless carrier (31); and
consecutive transverse members (32) mounted slidable on the endless carrier (31),
each transverse member (32) provided with
i) a front main body surface (39),
ii) a rear main body surface (38), wherein a width (W) of each transverse member extends across the front body surface (39), a height direction extends in a radial direction (H) of each transverse member (32), and a thickness direction (L) of each transverse member extends from the front body surface (39) to the rear body surface (38), and
iii) pulley contact faces (37), destined for contact with the sheaves (4, 5) of the pulleys (1, 2) of the transmission, extending from the front body surface (39) to the rear body surface (38) in the thickness direction along opposite edges of each transverse member (32),
wherein the transverse members (32) are comprised of at least a first type transverse member (32') and a second type transverse member (32"),
wherein a first thickness (D1) in the thickness direction (L) of the first type transverse member (32') is greater by a first proportion than a first thickness (D2) in the thickness direction (L) at a corresponding point of the second type transverse member (32"), and
wherein an overall width of the first type transverse member (32') is smaller by a second proportion than an overall width of the second type transverse member (32"), such that in operation the pulley contact faces (37) of both the first and second type transverse members (32', 32") make physical contact with the pulleys.

* * * * *